(12) United States Patent
Kukla et al.

(10) Patent No.: US 8,582,763 B2
(45) Date of Patent: Nov. 12, 2013

(54) METHOD AND APPARATUS FOR DECODING BROADBAND DATA

(75) Inventors: Hubert E. Kukla, Oberding (DE); Ingo Barth, Unterfohring (DE)

(73) Assignee: Comvenient GmbH & Co. KG, Munich (DE)

( * ) Notice: Subject to any disclaimer, the term of this patent is extended or adjusted under 35 U.S.C. 154(b) by 966 days.

(21) Appl. No.: 11/577,960

(22) PCT Filed: Oct. 19, 2005

(86) PCT No.: PCT/EP2005/011235
§ 371 (c)(1),
(2), (4) Date: Oct. 7, 2008

(87) PCT Pub. No.: WO2006/045507
PCT Pub. Date: May 4, 2006

(65) Prior Publication Data
US 2009/0052673 A1    Feb. 26, 2009

(30) Foreign Application Priority Data

Oct. 26, 2004  (DE) .......................... 10 2004 052 101

(51) Int. Cl.
*H04L 29/06*  (2006.01)
(52) U.S. Cl.
USPC ............. 380/45; 380/239; 380/277; 380/278; 726/19
(58) Field of Classification Search
USPC .......................................... 380/278, 277, 45
See application file for complete search history.

(56) References Cited

U.S. PATENT DOCUMENTS

| 4,658,093 A | * | 4/1987 | Hellman | 705/52 |
| 5,297,207 A | * | 3/1994 | Degele | 380/46 |
| 5,337,362 A | * | 8/1994 | Gormish et al. | 380/54 |

(Continued)

FOREIGN PATENT DOCUMENTS

WO     2004027622       4/2004

OTHER PUBLICATIONS

Lenstra K Arjen, Key Lengths, Contribution to The Handbook of Information Security, pp. 1-37, Jun. 30, 2004.*

(Continued)

*Primary Examiner* — Mohammad L Rahman
(74) *Attorney, Agent, or Firm* — Meyertons Hood Kivlin Kowert & Goetzel, P.C.; Jeffrey C. Hood

(57) ABSTRACT

The invention relates to a method for decrypting encrypted broadband data by one or more authorized users comprising the following steps: provision of the encrypted broadband data (10) for a plurality of users; provision of encrypted or non-encrypted key data (30), which is of a comparatively narrower band than the broadband data (10) and which is personalized for one or more authorized users, exclusively in a decryption unit (40), said narrow-band key data (30) being held in the decryption unit (40) in a form that is not accessible to the authorized user; at least partial decryption of the encrypted broadband data (10) in the decryption unit (40) in order to output a broadband data stream (70) that is at least partially decrypted; or generation of broadband key information (30') from the narrow-band key information (30) in the decryption unit (40) for the subsequent decryption of the encrypted broadband data (10).

16 Claims, 2 Drawing Sheets

(56) References Cited

U.S. PATENT DOCUMENTS

Figure 1:
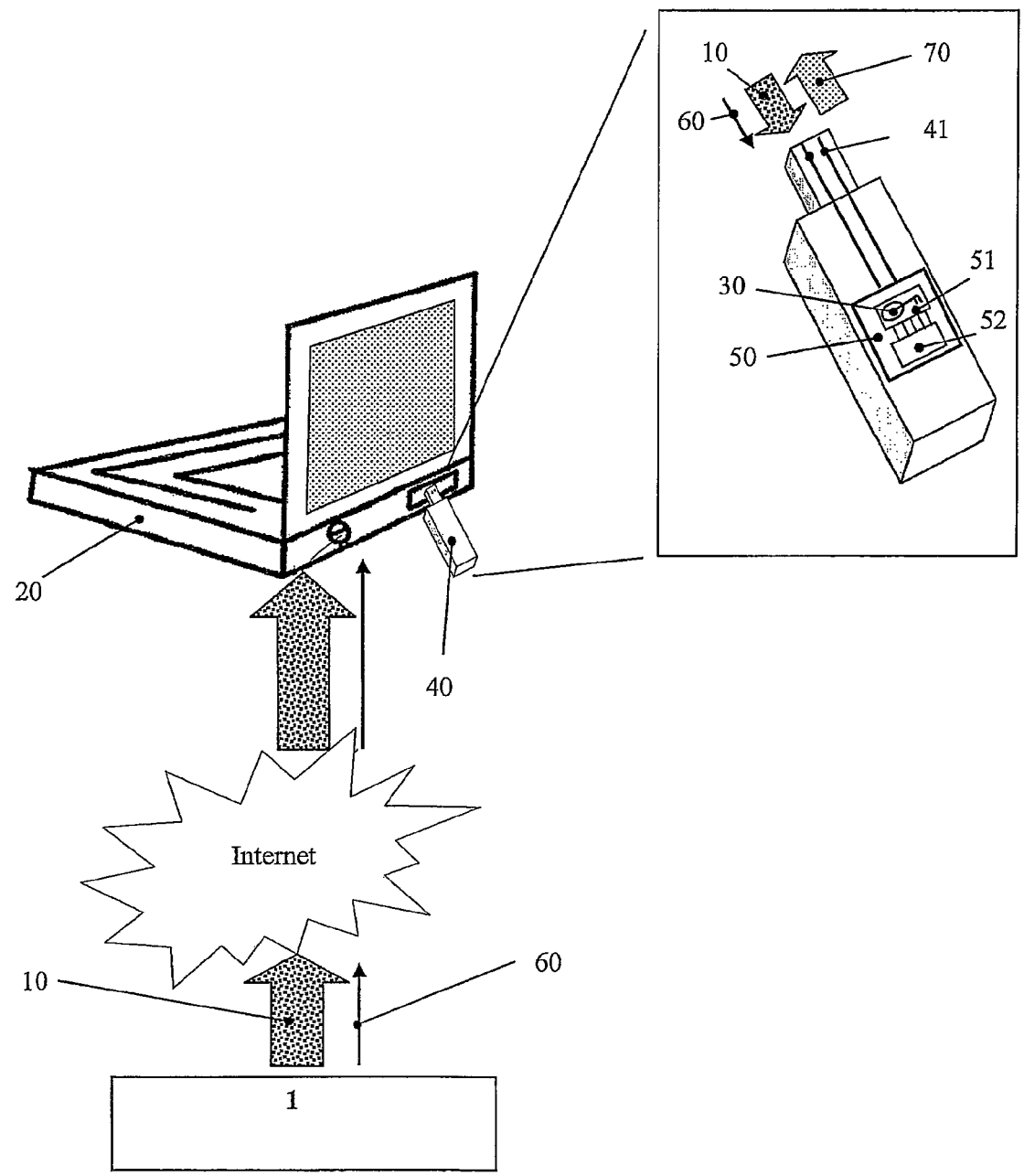

| | | | |
|---|---|---|---|
| 5,416,841 A * | 5/1995 | Merrick | 380/29 |
| 5,485,519 A * | 1/1996 | Weiss | 713/185 |
| 6,728,379 B1 | 4/2004 | Ishibashi et al. | |
| 7,095,853 B2 * | 8/2006 | Morishita | 380/201 |
| 7,099,479 B1 * | 8/2006 | Ishibashi et al. | 380/281 |
| 7,136,889 B1 * | 11/2006 | Schreck | 708/250 |
| 7,177,424 B1 * | 2/2007 | Furuya et al. | 380/37 |

OTHER PUBLICATIONS

International Preliminary Report on Patentability for application No. PCT/EP2005/011235, mailed Apr. 26, 2007.

English translation of International Preliminary Report on Patentability for application No. PCT/EP2005/011235, mailed Oct. 1, 2007.

International search report for application No. PCT/EP2005/011235, mailed Jan. 19, 2006.

* cited by examiner

METHOD AND APPARATUS FOR DECODING BROADBAND DATA

1. TECHNICAL FIELD

The present invention relates to a method and an apparatus for decoding encoded broadband data by one or more authorized users.

2. STATE OF THE ART

Large amounts of payload data, for example a video film, are available at the same time for several users in so-called on demand systems, for example via the internet or similar media or on rentable data carriers like DVDs etc. However, the actual use of the data additionally requires separate access information which is handed over to the user only after payment of a fee. If the user possesses the access information, in general the payload data are legitimately available for the user once or several times. However, the transfer of the payload data to a third party is generally not allowed.

The payload data are provided for a multitude of users in an encoded form in such a system. In order to decode these payload data, an authorized user or a group of authorized users has an individualized key. Upon closer inspection, the user has a second key which provides the key information for the decoding of the payload data together with a first key which is provided with the payload data.

During usage of these keys, special resources of the computer of the user are used such that the key information becomes available only on this computer. Such a link to the computer of the receiver can be accomplished for example by using a smart card. Here the smartcard releases the individualized key information for decoding the payload data to the computer of the legitimate owner which can decode the encoded payload data therewith, for example to consume a video film. This method is secure in an environment where the legitimate owner only uses the key information for the intended decoding of the data.

Unfortunately, there are many hackers which extract the key information from the above-explained system and make it available for other users, partly even on a commercial basis. In most cases the attack on the encryption system is performed by intercepting the key information released by the smartcard, before it is used for the decoding of the payload data. Such an attack is possible for an experienced hacker without great problems. There is even a large number of tools available for software solutions on the pc which are usable for such attacks and which make the access to the keys easier.

So-called dongles function in a similar way as smartcards to protect payload data. However, these protection mechanisms can be easily switched off by breaking into the protected software, provided that the pc is equipped appropriately. The tool for "switching off" the protection mechanism is directly distributed widely via electronic networks immediately thereafter.

In the explained method according to the prior art, the data size of the key information is narrowband, i.e. small, in relation to the broadband data size of the payload data that are first encoded and later decoded (for example several hundred Kbyte key information versus a video film with typically 5.5 Gbyte). Thus the key information can not only be easily extracted, but can also be distributed online via email etc. and anonymously if applicable. By contrast, a non-authorized distribution of decoded payload data (e.g. the decoded video data stream with a size of several Gbyte) can be considered as almost impossible or at least difficult because of the data size.

Consequently, the originally encoded payload data are virtually available for everybody in the internet or a similar medium, and the provider of these data has no or only a very limited control about their usage.

Therefore, the present invention addresses the problem to overcome the above-outlined disadvantages of the prior art and to provide a method and an apparatus in particularly with which encoded data with large data size can be protected against a non-authorized access and a wide distribution to non-authorized users.

3. SUMMARY OF THE INVENTION

According to one aspect, the present invention solves this problem by a method for decoding encoded broadband data by one or more authorized users with the following steps:

Providing the encoded broadband data for a plurality of users;

Providing encoded or non-encoded key information, which is narrowband in comparison to the broadband data and which is individualized for one or more authorized users, exclusively in a decoding unit, wherein the narrow band key information is held in the decoding unit in such a way that it is not accessible for the authorized user;

at least partial decoding of the encoded broadband data in the decoding unit for outputting an at least partially decoded broadband data stream; or generation of broadband key information from the narrowband key information in the decoding unit for the subsequent decoding of the encoded broadband data.

The order of the first two steps of the method is not important. Preferably, the decoding unit comprises a security component on which the narrowband key information is stored and which performs the decoding of the broadband data or the generation of the broadband key information. In another embodiment, the decoding unit comprises a first security component on which the narrowband key information is stored and a second security component which receives the narrowband key information from the first security component via a secure communication and which performs the decoding of the broadband data or the generation of broadband key information.

A first aspect of the method according to the present invention consists in the usage of one or more security chips not only for providing the narrowband key information, but also for decoding the payload data, i.e. performing the decoding in the secure environment of the decoding unit. In the end, a pc or another general purpose computer is perfectly accessible for an experienced hacker such that the keys used therein are always in danger to be extracted earlier or later. In contrast, according to the above-outlined method the narrowband key information remains in the secure decoding unit both when it is provided and when the encoded broadband data are at least partially decoded or the broadband key information is generated. Consequently, only broadband information is released from the decoding unit (the partially decoded data or the generated broadband key information) which can be transferred to a non-authorized third party only at high costs.

In order to apply the above-outlined method to video data, it is advantageous if the data transfer rate of the decoding security chip is in the range of several Mbit/s. In a preferred embodiment, at least parts of the narrowband key information are transferred to the decoding unit in an encoded form and decoded there, before the decoding of the broadband data or the generation of the broadband key information.

According to a further aspect, the present invention relates to a decoding unit for decoding encoded broadband data which are made accessible to a plurality of users by one or more authorized users with a storage region that stores key information which is narrowband in comparison to the broadband data and which is individualized for the authorized user in a non-permanent or permanent way such that it is not accessible for the authorized user(s), a processing region which is not accessible for the authorized user(s) and which at least partially decodes the encoded broadband data using the stored narrowband key information, in order to release them as at least partially decoded broadband data stream or which generates a broadband key information for the subsequent decoding of the broadband data, wherein the decoding unit is formed as a single security component or as a plurality of security components which are connected to each other via a secure communication connection.

Further advantageous features of the inventive method and of the decoding unit can be found in further dependent claims.

4. SHORT DESCRIPTION OF THE FIGURES

In the following, aspects of the present invention are explained referring to the accompanying figures. These figures show:

FIG. 1: A schematic view of a first embodiment of the decoding unit according to the invention for usage in a first embodiment of the method according to the present invention.

Figure 2:
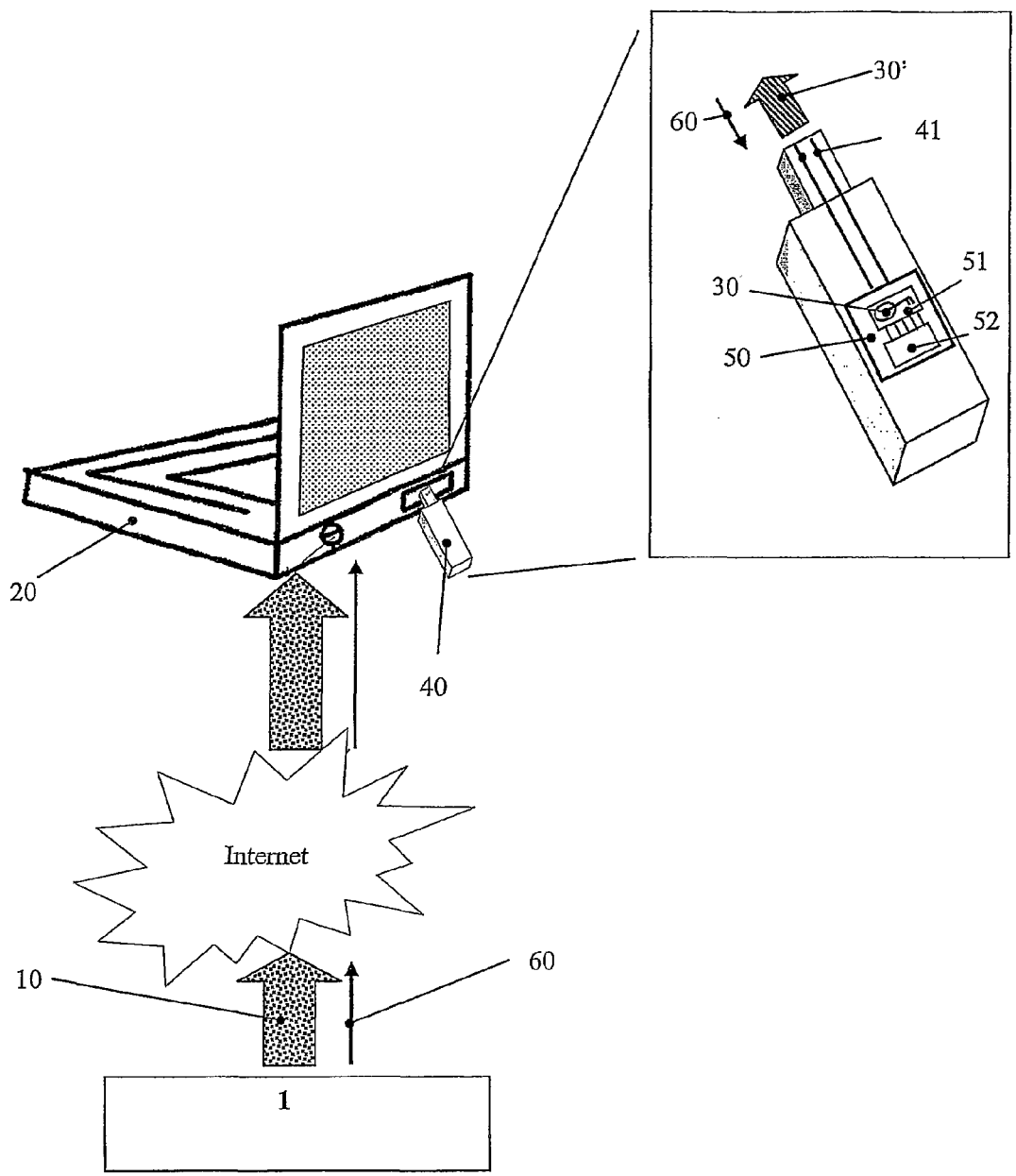

FIG. 2: A schematic view of a second embodiment of the decoding unit according to the present invention for usage in a second embodiment of the method according to the present invention.

5. DETAILED DESCRIPTION OF THE PREFERRED EMBODIMENTS

FIG. 1 shows a first currently preferred embodiment of the present invention. Here a user downloads video data 10 for view on his personal computer 20 (here shown as a notebook). Instead of pc 20, also another suitable apparatus could be used which is capable to download video data from the internet or from another data source.

Video data 10 are provided in the internet by a provider 1 in an encoded form. Therefore, it is in principle possible for a plurality of users to download video data 10. Instead of downloading them from the internet, which assumes a high bandwidth of the internet access, the user can also obtain the encoded video data on a bought or rented DVD or another data carrier. Independently, the usage of the data, i.e. the watching of the video film, requires narrowband key information 30, i.e. key information which has a significantly smaller data size in comparison to the broadband video data 10. In the embodiment shown in FIG. 1, this key information 30 is held on a USB stick 40.

As shown schematically in FIG. 1, the encoded video data 10 are moved to a security chip 50 within the USB stick. The narrowband key information 30, which is used in a processing region 52 of a security chip 50 to decode the incoming encoded video data 10, is stored in a storage region 51 of security chip 50.

Decoded video data 70 are given back to pc 20 via an interface 41 of USB stick 40. A suitable application program on the pc can present the decoded video data stream to the pc user. It is not necessary that security chip 50 performs the complete decoding of video data 10. However, it is essential that data stream 70 which leaves USB stick 40 is broadband such that an easy distribution via email etc. is hardly possible because of the data size alone.

Depending on the required data rate, techniques of watermarking etc. can be integrated into the decoding of the video data such that the decoded video data stream 70 becomes identifiable. Thereby, one can additionally prevent or keep track, if despite its size the data stream of the decoded video has been transferred to a third party without authorization.

Instead of a single security chip 50 it is also conceivable to arrange two security chips in USB stick 40 (not shown), one of them takes over the storage of narrow band key information 30 and the other the decoding of the video data. In this case, key information 30 is transmitted between the two security chips via a secure communication channel.

According to systems known in the prior art, the key information is transferred from the secure environment, e.g. a smartcard, to the more powerful but less secure environment of a pc, such that one or more CPUs of the pc perform the decoding and release the decoded video data stream. According to the present invention the provision of narrowband key information and the decoding is performed in a unit which consists either of a single physical component (security chip 50 as shown in FIG. 1) or of a solution which is coupled in secure manner (two ore more security chips which are coupled securely to each other, not shown). The secure coupling of two security chips can be built up by a hardware support of the encoding of the data channel between the hardware components e.g. by using a session key negotiation using on RSA challenge without the loss of security for the concept.

Effectively, the key information 30 is not extracted into the environment of the personal computer in both variants and can thus not be determined by manipulating software and hardware of the pc. This is possible, since there are security chips available which are capable of transferring and decoding data sizes of the order of several Mbit/s. Classical smartcards (according to ISO 7816 or cards without contact) have serial interfaces which allow data rates not greater than one Mbit/s and are thus not suitable for the decoding of the data. In contrast, the USB stick which is shown in FIG. 1 comprises a data rate which is essentially twice the data rate of video data 10, since these data are received, at least partially decoded and then given back to pc 20. The maximal data transfer rate of security chip 50 limits the possibly usable bit rate.

As shown in FIG. 1, in a preferred embodiment a small data management stream 60 for managing the access authorization is transmitted to pc 20 and thus to USB stick 40 in addition to encoded video data 10. For this purpose, USB stick 40 is preferably individually addressable and has an individual key (not shown) at its disposal. Thereby, a secure data channel can be built up between provider 1 and USB stick 40. Via this data channel, the key information for decoding encoded video data 10 is sent encoded with the individual key of USB stick 40 (not shown). Alternatively, the key information can be integrated directly into encoded video data 10.

If the key information has been decoded by the individual key of the USB stick, it is available as individualized key information 30, in order to perform the at least partial decoding of video data 10, as explained above.

In addition, also more complex concepts like the provision of rights for the n-fold replay of the video data 10 or for the time restriction of the usage of the video data can be realized via data management stream 60. Various applications which require more than a pure yes/no decision whether a user is authorized to use the offered broadband data are thus possible without further ado.

FIG. 2 shows a further embodiment of the present invention. In contrast to the embodiment outlined above, the decoding of the encoded video data takes place on the pc or another suitable apparatus as in the prior art. Key information 30', which is necessary for this, is generated by the USB stick from the key information 30 and is given to the pc. This key information 30' differs from key information 30 within the USB stick 40 in its size. Whereas key information 30, which remains exclusively in the USB stick, is narrowband, i.e. significantly smaller than video data 10 which are to be decoded, key information 30' is broadband, i.e. its size is essentially of the same order as video data 10. Thereby, a distribution to non-authorized third parties is prevented or at least made difficult in this embodiment as well.

Also in this embodiment, key information 30 within USB stick 40 can be first generated from an individualized key of the USB stick and further key information which is either added to video data 10 or which is sent to USB stick 40 via the additional data management stream 60.

The invention claimed is:

1. Method for generating information used in decoding encoded broadband data by one or more authorized users comprising the following steps:
   a. Providing the encoded broadband data for a plurality of users;
   b. Providing encoded or non-encoded key information, which is narrowband in comparison to the broadband data and which is individualized for one or more authorized users, exclusively in a decoding unit, wherein the narrowband key information is held in the decoding unit in a form which is not accessible for the authorized user, wherein at least parts of the narrowband key information are transferred into the decoding unit in an encoded form and are decoded there before the generation of broadband key information, and wherein the transfer of parts of the narrowband key information comprises specification of rights for usage of the broadband data by the user(s) for multiple or time limited usage;
   c. wherein the narrowband key information is usable for generating broadband key information from the narrowband key information in the decoding unit for the subsequent decoding of the encoded broadband data, wherein the data size of the narrowband key information is at least several thousand times smaller than the data size of the broadband data, and wherein the broadband key information has a size of essentially the same order of magnitude as the broadband data.

2. Method according to claim 1, wherein the decoding unit comprises a security component, where the narrowband key information is stored and which performs the generation of the broadband key information.

3. Method according to claim 1, wherein the decoding unit comprises a first security component and a second security component, wherein the narrowband key information is stored by the first security component, and wherein the second security component is configured to receive the narrowband key information from the first security component via a secure communication and perform the generation of broadband key information.

4. Method according to claim 2, wherein the data transfer rate of the decoding or generating security component is in the range of several Mbit/s.

5. Method according to claim 1, wherein the output data stream is digitally signed.

6. A decoder for generating information used in decoding encoded broadband data, which are made accessible to a plurality of users, by one or more authorized users, comprising:
   a. a storage region, which stores key information, which is narrowband in comparison to the broadband data and which is individualized for the authorized user, in a non-permanent or permanent way such that it is not accessible for the one or more authorized user(s);
   b. a processing region which is not accessible to the authorized user(s) and which generates broadband key information for the subsequent decoding of broadband data, wherein the generation of the broadband key information uses the stored narrowband key information, the data size of the narrowband key information is at least several thousand times smaller than the data size of the broadband data, and wherein the broadband key information has a size of essentially the same order of magnitude as the broadband data, wherein at least parts of the narrowband key information are transferred into the decoding unit in an encoded form and are decoded there before the generation of broadband key information, and wherein the transfer of parts of the narrowband key information comprises specification of rights for usage of the broadband data by the user(s) for multiple or time limited usage; and
   c. wherein the decoder is formed as a single security component or as a plurality of security components which are connected to each other via a secure communication connection.

7. The decoder according to claim 6, further comprising units for an encoded transmission of at least parts of the narrowband key information into the storage region of the decoder.

8. The decoder according to claim 6, further comprising an interface for receiving the encoded broadband data and for outputting the broadband key information.

9. The decoder according to claim 6, wherein the decoder is realised as a USB stick.

10. Method for receiving information used in decoding encoded broadband data by one or more authorized users comprising the following steps:
    a. Receiving the encoded broadband data;
    b. Receiving encoded or non-encoded key information, which is narrowband in comparison to the broadband data and which is individualized for one or more authorized users, exclusively in a decoding unit, wherein the narrowband key information is held in the decoding unit in a form which is not accessible for the one or more authorized users, wherein at least parts of the narrowband key information are transferred into the decoding unit in an encoded form and are decoded there before the generation of broadband key information, and wherein the transfer of parts of the narrowband key information comprises specification of rights for usage of the broadband data by the user(s) for multiple or time limited usage; and
    c. Generating broadband key information from the narrowband key information in the decoding unit for the subsequent decoding of the encoded broadband data, the data size of the narrowband key information is at least several thousand times smaller than the data size of the broadband data, and wherein the broadband key information has a size of essentially the same order of magnitude as the broadband data.

11. Method according to claim 10, wherein the decoding unit comprises a security component, where the narrowband key information is stored and which performs the generation of the broadband key information.

12. Method according to claim 11, wherein the data transfer rate of the decoding or generating security component is in the range of several Mbit/s.

13. Method according to claim 10, wherein the decoding unit comprises a first security component and a second security component, wherein the narrowband key information is stored by the first security component, and wherein the second security component is configured to receive the narrowband key information from the first security component via a secure communication and perform the generation of broadband key information.

14. Method according to claim 10, wherein the output data stream is digitally signed.

15. Method according to claim 1, wherein the data size of the broadband data is approximately ten thousand times bigger than the data size of the narrowband key information.

16. Method according to claim 10, wherein the data size of the broadband data is approximately ten thousand times bigger than the data size of the narrowband key information.

\* \* \* \* \*